United States Patent [19]
Stough

[11] Patent Number: 5,761,604
[45] Date of Patent: Jun. 2, 1998

[54] MUSIC KEY FOR DIRECTLY SELECTING AUDIO CHANNELS ON SATELLITE RECEIVER

[75] Inventor: Michael E. Stough, Knoxville, Tenn.

[73] Assignee: Philips Electronics North America Corporation, New York, N.Y.

[21] Appl. No.: 637,845

[22] Filed: Apr. 25, 1996

[51] Int. Cl.⁶ .............. H04H 1/00; H04N 5/44; H04Q 3/58
[52] U.S. Cl. .............. 455/3.2; 348/734; 340/825.25
[58] Field of Search .............. 348/734; 455/3.2; 340/825.25; H04N 5/44

[56] References Cited

U.S. PATENT DOCUMENTS

| 5,640,673 | 6/1997 | Tanabe | 455/3.2 |
| 5,648,760 | 7/1997 | Kumar | 340/825.25 |

*Primary Examiner*—Howard W. Britton
*Attorney, Agent, or Firm*—Laurie E. Gathman

[57] ABSTRACT

A set top box and remote control system, wherein the set top box is provided with preselect keys for storing the program identifier of a user's favorite program. The preselect keys being accessible by a remote control as well as manually.

16 Claims, 3 Drawing Sheets

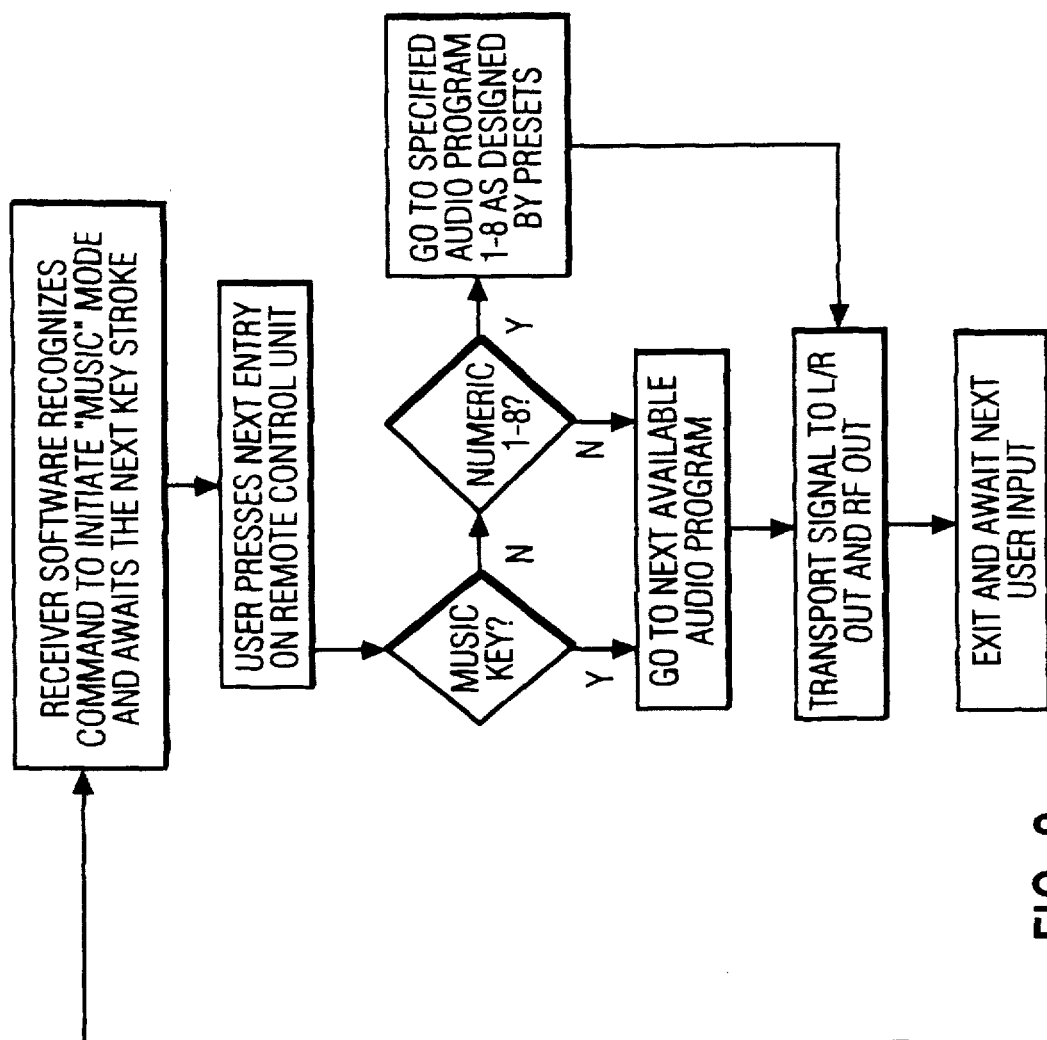
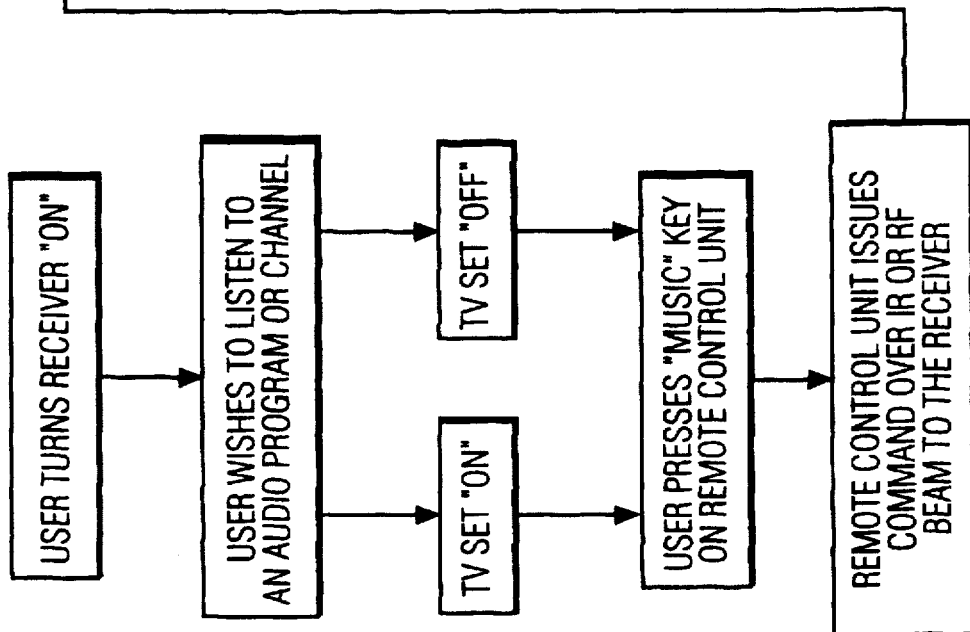
FIG. 3

MUSIC KEY FOR DIRECTLY SELECTING AUDIO CHANNELS ON SATELLITE RECEIVER

BACKGROUND OF THE INVENTION

1. Field of the Invention

This invention relates in general to receiver/decoder systems and in particular to a set top box decoder, remote control and preselect device for easily selecting a user's favorite audio, television, or data program that is received scrambled and/or encrypted from a cable provider.

2. Description of the Prior Art

Television programming has increased over the years from programming that provided only a few networks to programming that provides a variety of networks and other types of services. Television providers such as satellite providers, cable providers, LMDS and MMDS providers etc. (hereinafter in the specification and claims "program providers") deliver television programs, audio programs, telephony etc. to home users through a decoder/receiver ("set top box"). The number of programs delivered by a program provider can well exceed a hundred. Some of these programs are typical movie and sports programs while others could include audio programs such as classic rock, jazz, country music etc., or data programs such as stock quotes or weather. It is now customary for many program providers to supply paper programming guides to assist the customer in wading through the variety of services offered by the program provider and the "channel" number for each particular type of program. Instead of, or in addition to, the paper programming guides many program providers deliver to the home user an on-screen program guide. Some of these on-screen program guides continuously scroll through all of the programs available for the next hour or so and the channel that a user can select to receive a particular program. If there are, for example, 150 "channels" or programs and a user is looking for a channel which provides classic rock, he/she may have to wait to view all program names on the program guide for all 150 channels before finding the classic rock channel.

Some on-screen program guides enable a user to view the program guide only for those channels showing a particular type of programming, e.g., the channel number and programming for all of the audio channels. An on-screen programming guide may also have an added feature of enabling a user to scan up and down the program guide by using the channel up/down keys rather than having to wait for the program guide itself to scroll through all of the programs. Although this limits the number of programs in the program guide that a user must sort through before finding his/her favorite program, it is still a cumbersome technique for a user to find his/her favorite program. For example, if a user has a favorite program such as the classic rock audio program the user must either remember the three-digit "channel" number for the classic rock program, use the program guide each time to refresh the user's memory or actually use the channel selector on the set top box to scan through the available programming to find the classic rock audio program. Since most people have several favorite audio programs, several favorite sports programs, several favorite movie programs and a favorite home improvement program, it is difficult to remember the three-digit channel number for each favorite program and it is also time consuming to use the program guides to find the three-digit channel number and then enter the three-digit channel number on the remote control to finally find the favorite program. For home satellite systems, which provide an abundance of different programming, the process of wading through the extensive program guides is very time consuming.

SUMMARY OF THE INVENTION

Generally speaking, in accordance with the instant invention, a set top box (receiver/decoder) and a remote control system are provided which enable a user to quickly access a user's favorite audio, data or television program.

It is an object of the invention to enable a user to easily select favorite programs (channels) by setting and using preselect keys located on the set top box. In accordance with this object, the preselect keys include associated memory units for storing the program identifier of a user's favorite program. The preselect keys can, for example, be set to a user's favorite program by setting the set top box to decode a particular program, depressing a separate "set" key and then depressing a preselect key to cause the program identifier of the favorite program to be stored in the memory unit of the preselect key. Alternatively, instead of a "set" key the preselect keys can be programmed such that if the preselect key is depressed for a predetermined period of time it will cause the program identifier of the particular program being decoded to be stored in the memory unit of the preselect key. Once a preselect key is programmed the user can then go right to the preselect key each time the user wishes to view his/her favorite program. The memory unit associated with the preselect key will then provide the program identifier to a detector in the set top box and the detector will locate the video stream associated with the program identifier and the decoder will begin decoding the portion of the video stream which corresponds to the program identifier.

It is another object of the invention to enable the user to access, via a remote control, the programs that have their program identifiers stored in the memory units of the preselect keys. In accordance with this object the remote control is provided with a function key that enables the user to place the set top box in a function mode and then depending on the next remote control key selected by the user, the program that has its program identifier stored in the memory unit of the preselect key corresponding to the selected remote control key will be decoded by the decoder for viewing.

BRIEF DESCRIPTION OF THE DRAWINGS

For a fuller understanding of the invention reference will be made to the following drawings:

FIG. 3 shows a flow chart of the operation of a preferred embodiment of the invention.

DETAILED DESCRIPTION OF THE PREFERRED EMBODIMENTS

Figure 1:
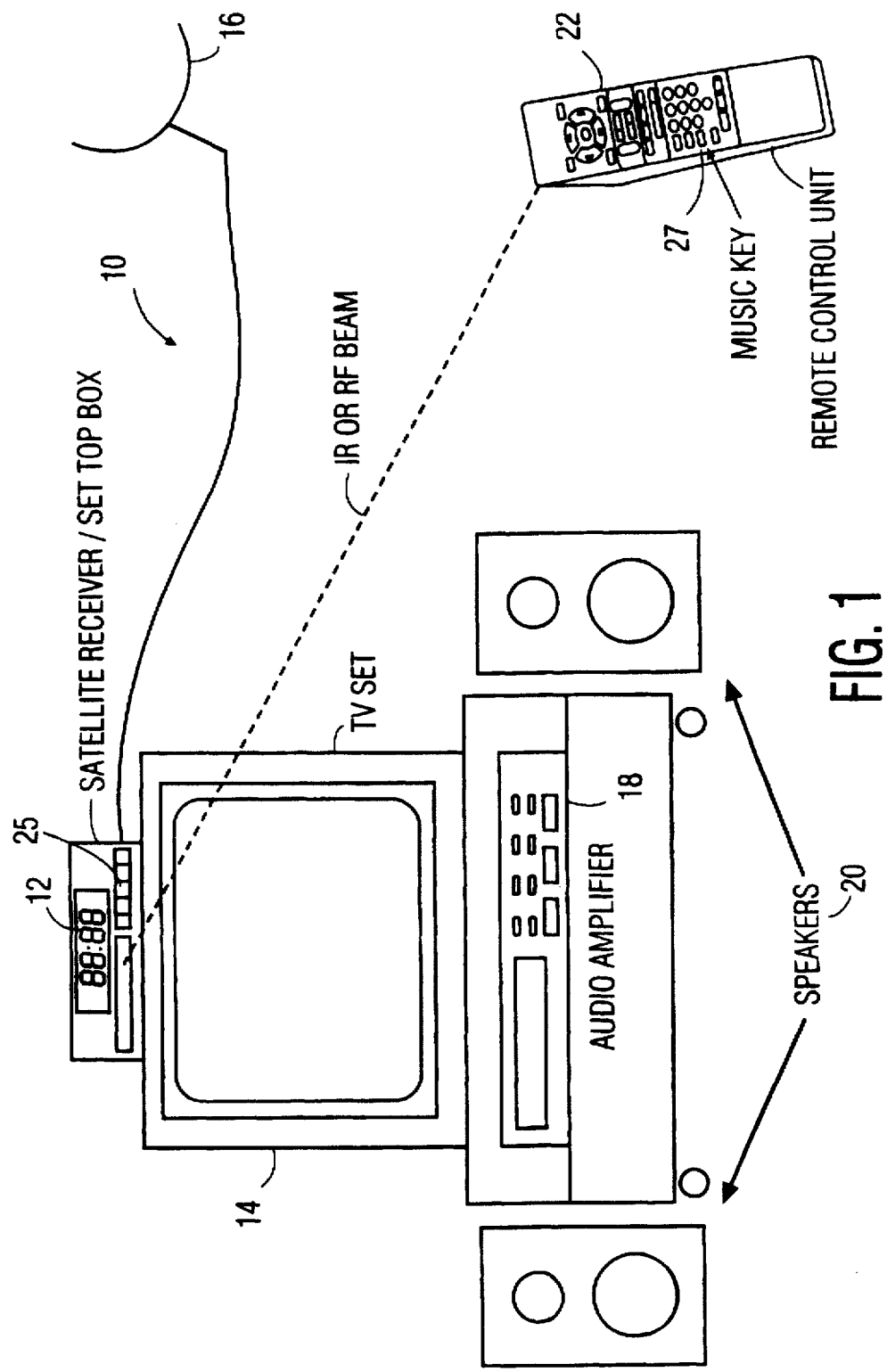
FIG. 1 shows a satellite receiver/decoder system in accordance with the invention.

FIG. 1 shows a satellite receiver/decoder system 5 in accordance with a preferred embodiment of the invention. Receiver/decoder 12 (set top box) is coupled to a television 14 to receive a signal from an antenna 16 that in turn receives programming from a satellite or another type of program provider (not shown). The program provider delivers television, and other programming to the set top box 12 and the set top box 12 decodes a program selected by the user. The decoding process can include descrambling and/or decrypting. The system can also include an audio amplifier 18 having speakers 20.

Set top box 12 can either be controlled manually or via remote control 22. Provided on set top box 12 are preselect keys 25, which are mapped to memory units 10 for storing program identifiers of user selected television, data or audio programming or "channels." This provides the user with direct access to favorite programs and eliminates the need for a user to remember possibly a three-digit channel number or wade through a program guide.

A user selects a preselect key 25 and programs the memory unit 10 corresponding to the selected preselect key 25 to store the program identifier of a favorite audio, data or television channel. The setting of the preselect keys 25 can be performed in a variety of fashions such as setting the set top box 12 to decode the favorite program and then holding down one of the preselect keys 25 for a specified period of time (e.g. five seconds) which would cause the program identifier of the decoded program to be stored in the memory unit 10 of the selected preselect key 25. Similarly, a separate "set" button could be placed on the set top box 12 and the action of depressing the set button and then a preselect key would cause the program identifier of the decoded program to be stored in the memory unit of the preselect key.

In FIG. 1, the set top box 12 includes five preselect keys 25. The user may choose to program the first key to store the program identifier of the user's favorite jazz audio channel, the second key may be used to store the program identifier of the user's favorite movie channel and the third key may be used to store the program identifier of the user's favorite home improvement channel etc. These preselect keys 25 enable the user to access the user's favorite channels by walking up to the set top box 12 and depressing a preselect key 25 or as explained below by using a function key 27 on the remote control 22.

Figure 2:
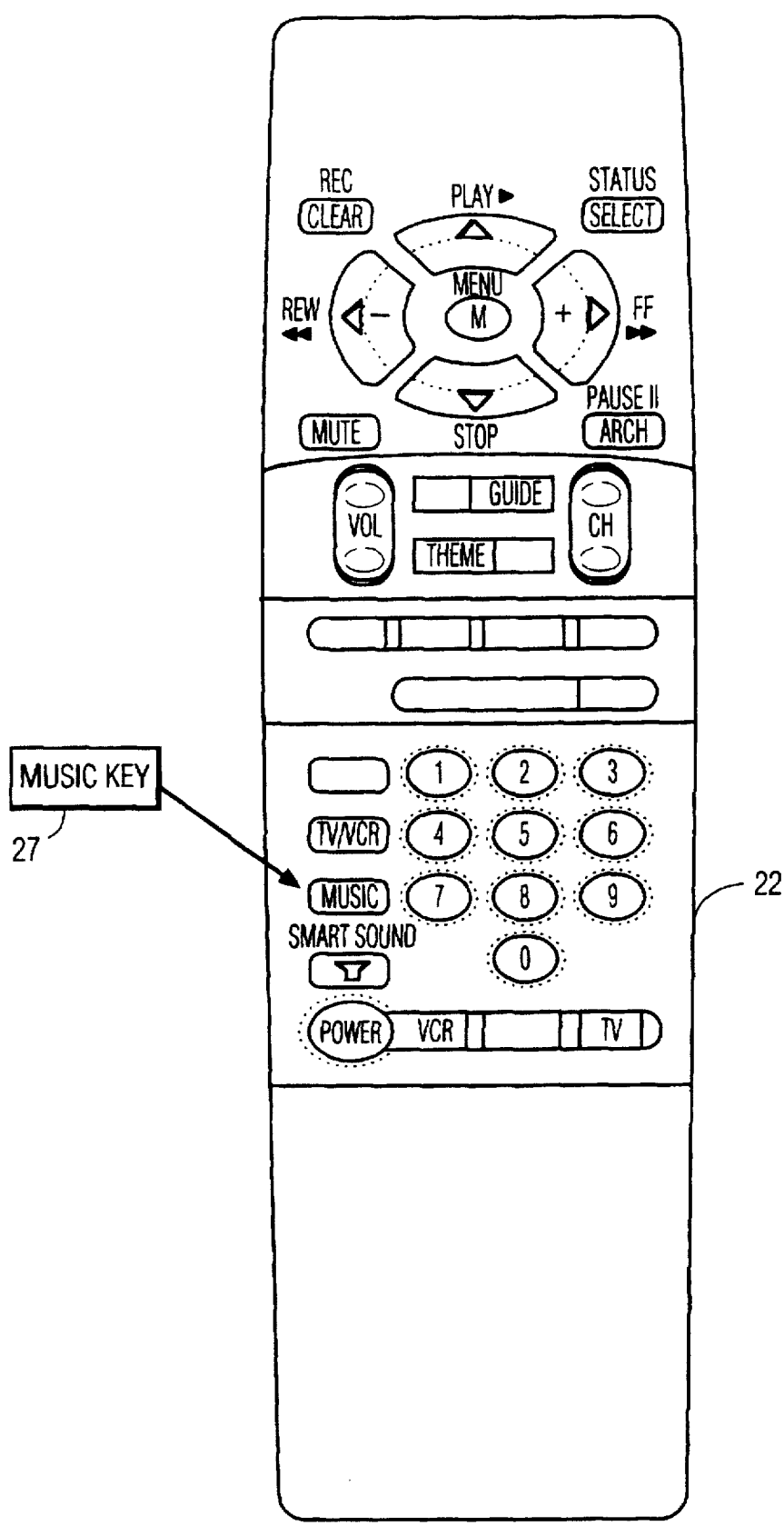
FIG. 2 shows a more detailed view of a remote control in accordance with the invention.

As can be seen in FIG. 1, provided on the remote control 22 is a function key labeled the music key 27. (FIG. 2 shows a more detailed view of the remote control 22 in accordance with the invention). The music key 27 could also be replaced with, or in addition to, a sports key, a movie key etc. or simply a generic function key. The set top box 12 could include several preselect keys 25 for audio channels, several preselect keys 25 for sports channels etc., or each preselect key 25 could include a plurality of memory units 10 each dedicated to receive the program identifier of either a user's favorite sports channel, audio channel or movie channel and each memory unit being accessed depending on the type of function key depressed on the remote control. For example, a separate function key 27 for each category type (movie, audio etc.) would be used to access each category type of memory location of a particular preselect key 25. Although the preselect keys 25 are manually operated by a user, the function key 27 on the remote control 22 enables a user to remotely access the user's favorite preselected programs by sending an IR or RF signal to an IR or RF detector on the set top box 12.

Assuming function key 27 is a music key and the preselect keys 25 are to be accessed via the remote control 22, the user must first place the set top box 12 into, for example, the "music model" by depressing the music key 27 and then the user must select a preselect audio key 25 via the remote control 22 by depressing a number key representing a preselect key 25. The set top box 12 then selects the memory location 10 that corresponds to the chosen preselect key 25 selected by the user via the remote control 22. (When the set top box is initially placed into the "music model" it could cause the decoder of the set top box 12 to automatically select the program having a program identifier stored in the memory unit 10 of the first preselect key). Assuming the user wishes to listen to his/her favorite jazz audio channel, which is preset in the third audio preselect key, the user must depress the "3" key on the remote control 22 after depressing the music key 27. This indicates to the set top box 12 that the user wishes to listen to the audio information of the program that has its program identifier stored in the memory location mapped to the third preselect key on the set top box 12. The set top box 12 will then access this memory location and decode the portion of the data stream having the program identifier for jazz programming and the jazz programming will then be provided to the speakers 20. If the user wishes to access his/her favorite sports channel which is preset in a different memory unit associated with the same preselect key, the user must depress the sports key (not shown) and then depress the "3" key on the remote control 22.

FIG. 3 is a flow chart that shows the operation of the system in the music mode. A user turns ON the set top box 12. If the preselected audio keys 25 have been set to the user's favorite audio program, the user will first select the music mode by depressing the music key 27. (As shown in the flow chart it is not necessary that the television be ON if additional speakers and an amplifier are coupled to the set top box 12.) The remote control 22 issues a command over the IR or RF beam to the set top box 12. Software within the set top box 12 recognizes the command to initiate the "music" mode and provides to the user the program having its program identifier stored in the memory unit of the first preselect key and then awaits the next key stroke. If the user again presses the music key 27 the set top box will recognize this command to mean that the set top box 12 should provide the next audio program that has its program identifier stored in a next preselect key 25. In a preferred embodiment, the set top box 12 is removed from the music mode if there is no keystroke within a certain period of time. This timeout in a preferred embodiment of the invention is performed by software.

In addition the user could select a preselected audio channel by selecting a numerical key 1-N (where N corresponds to the number of preselect keys 25) after the set top box 12 is placed in the music mode.

It should be noted that the preselect keys could also be provided for data channels such as stock quotes, weather information etc. This way the user can simply select his/her favorite data channel without having to remember its channel number or without having to scan through all of the channels provided by the cable provider.

As seen from the above description the instant invention provides quick access to a user's favorite program without having to remember the channel number and without having to search through the programming guide.

It will thus be seen that the objects set forth above, among those made apparent from the preceding description, are efficiently attained and, since certain changes may be made in the above construction without departing from the spirit and scope of the invention, it is intended that all matter contained in the above description as shown in the accompanying drawings shall be interpreted as illustrative and not in a limiting sense.

It is also to be understood that the following claims are intended to cover all of the generic and specific features of the invention herein described and all the statements of the scope of the invention which as a matter of language, might be said to fall therebetween.

In the claims:

1. A set top box for use in conjunction with a television and for receiving and decoding programming received from a program provider which programming includes a plurality of coded programs each coded program having a unique program identifier, and for providing the decoded programming to the television, the set top box comprising:

a program selector scanner for enabling a user to scan the program identifiers provided by the program provider to find a program identifier of a coded program which a user wishes to be displayed;

a detector for receiving user selected program identifiers and for detecting the program identifiers in the received coded programs;

a decoder for decoding for display on the television the program corresponding to the program identifier detected by the detector;

a plurality of preselect keys, each preselect key having an associated user programmable memory unit for storing a preselected program identifier of a user's favorite program, such that instead of having to use the program selector to scan through the received program identifiers to find the user's favorite program, a particular preselect key is selected by the user and the user preselected program identifier of the user's favorite program stored in the associated memory unit of the selected preselect key is supplied to the detector.

2. The set top box in accordance with claim 1, wherein a plurality of memory units are associated with each preselect key.

3. The set top box in accordance with claim 1 or 2, further including a signal detector for detecting an access signal to access a particular preselect key from a remote control and for causing the decoder to decode the program having its program identifier stored in the memory unit of the particular preselect key.

4. The set top box in accordance with claim 1, further including a programmer for programming the preselect keys such that when a preselect key is depressed for a predetermined period of time the program identifier of the coded program presently being decoded is stored in the memory unit associated with the depressed preselect key.

5. The set top box in accordance with claim 1, further including a set key for programming the preselect keys such that if the set key is depressed and then a preselect key is selected the program identifier of the coded program presently being decoded is stored in the memory unit associated with the depressed preselect key.

6. A remote control system including a set top box and a remote control for use with a television, the set top box for receiving and decoding programming received from a cable provider which programming includes a plurality of coded programs each program having a unique program identifier, and for providing the decoded programming to the television, the set top box comprising:

a selector scanner for enabling a user to scan the program identifiers provided by the program provider to find a program identifier of a coded program which a user wishes to be displayed on the television;

a detector for receiving user selected program identifiers and for detecting the program identifiers in the received coded programs;

a decoder for decoding for display on the television the programs corresponding to the program identifiers detected by the detector;

a plurality of preselect keys, each preselect key having an associated user programmable memory unit for storing a preselected program identifier of a user's favorite program, such that instead of having to use the program selector to select the user's favorite program, a particular preselect key is selected by the user and the preselected program identifier of the user's favorite program stored in the associated memory unit of the selected preselect key is supplied to the detector;

a signal detector for detecting a function signal and an access signal to access a particular preselect key via the remote control and for causing the program identifier stored in the memory unit of the particular preselect key to be provided to the detector during a function mode; and the remote control comprising:

an electromagnetic signal generator for generating i) the function signal to cause the set top box to enter the function mode and (ii) the access signal to access a particular preselect key;

a function key for causing the electromagnetic signal generator to generate the function signal.

7. The remote control system in accordance with claim 6, wherein the remote control unit includes a plurality of function keys for causing electromagnetic signals to be generated that place the set top box in a plurality of function modes and wherein a plurality of memory units are associated with each preselect key each memory unit of a particular preselect key being accessible during a different function mode.

8. The remote control system in accordance with claim 6, wherein the remote control unit includes a plurality of function keys for placing the set top box in a plurality of function modes and wherein a different plurality of preselect keys are accessible during a different function mode.

9. The remote control system in accordance with claim 6, wherein if a user selects the function key, the signal detector detects this selection and causes the program having its program identifier stored in a first preselect key to be decoded and provided to the television.

10. The remote control system in accordance with claim 6, wherein the set top box further includes a programmer for programming the preselect keys such that when a preselect key is depressed for a predetermined period of time the program identifier of the coded program presently being decoded is stored in the memory unit associated with the depressed preselect key.

11. The remote control system in accordance with claim 6, wherein the set top box further includes a set key for programming the preselect keys such that if the set key is depressed and then a preselect key is selected the program identifier of the coded program presently being decoded is stored in the memory unit associated with the depressed preselect key.

12. The remote control system in accordance with claim 6, wherein the remote control includes a plurality of remote keys each representing a particular preselect key and wherein after selection of the function key and then a remote key the program, having the program identifier stored in the memory unit associated with the preselect key represented by the selected remote key, is decoded and provided to the television.

13. The remote control system in accordance with claim 6, wherein the set top box is removed from the function mode after the detector does not detect an electromagnetic signal for a predetermined period of time.

14. The remote control system in accordance with claim 6, wherein the function key is a music function key and the memory units associated with the preselect keys are to be used for storing program identifiers of audio programs.

15. The remote control system in accordance with claim 6, wherein the function key is a sports function key and the memory units associated with the preselect keys are to be used for storing program identifiers of sports programs.

16. The remote control system in accordance with claim 6, wherein the function key is a data function key and the memory units associated with the preselect keys are to be used for storing program identifiers of data programs.

* * * * *